United States Patent
Lee et al.

(10) Patent No.: US 11,915,875 B2
(45) Date of Patent: Feb. 27, 2024

(54) MULTILAYER ELECTRONIC COMPONENT

(71) Applicant: SAMSUNG ELECTRO-MECHANICS CO., LTD., Suwon-si (KR)

(72) Inventors: Chae Dong Lee, Suwon-si (KR); Og Soon Kim, Suwon-si (KR); Hye Won Kim, Suwon-si (KR); Jung Won Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 9 days.

(21) Appl. No.: 17/725,857

(22) Filed: Apr. 21, 2022

(65) Prior Publication Data

US 2023/0215639 A1 Jul. 6, 2023

(30) Foreign Application Priority Data

Dec. 31, 2021 (KR) .................. 10-2021-0194289

(51) Int. Cl.
*H01G 4/232* (2006.01)
*H01G 4/30* (2006.01)

(52) U.S. Cl.
CPC .......... *H01G 4/2325* (2013.01); *H01G 4/30* (2013.01)

(58) Field of Classification Search
CPC ...... H01G 4/2325; H01G 4/30; H01G 4/0085; H01G 4/012; H01G 4/1209; H01G 4/1227; H01G 4/12; H01G 4/232; Y02E 60/13
See application file for complete search history.

(56) References Cited

U.S. PATENT DOCUMENTS

| | | | | |
|---|---|---|---|---|
| 10,453,613 B2 * | 10/2019 | Zenzai | ............... | C09D 5/24 |
| 2005/0219789 A1 | 10/2005 | Akimoto et al. | | |
| 2014/0233147 A1 * | 8/2014 | Hong | ............... | H01G 4/008 |
| | | | | 361/301.4 |
| 2015/0213953 A1 * | 7/2015 | Jun | ............... | H01G 4/30 |
| | | | | 252/512 |
| 2015/0364256 A1 * | 12/2015 | Zenzai | ............... | C09D 5/24 |
| | | | | 252/514 |
| 2017/0301468 A1 * | 10/2017 | Kim | ............... | H01G 4/30 |
| 2018/0286594 A1 * | 10/2018 | Kim | ............... | H01G 4/248 |
| 2021/0057155 A1 * | 2/2021 | Zenzai | ............... | H01G 4/008 |

FOREIGN PATENT DOCUMENTS

| | | | |
|---|---|---|---|
| KR | 10-2006-0045129 A | | 5/2006 |
| KR | 20150089276 A | * | 8/2015 |
| KR | 10-2015-0144290 A | | 12/2015 |
| KR | 20150144290 A | * | 12/2015 |
| KR | 10-1814084 B1 | | 1/2018 |
| KR | 20200018554 A | * | 2/2020 |

* cited by examiner

*Primary Examiner* — Dion R. Ferguson
(74) *Attorney, Agent, or Firm* — Morgan, Lewis & Bockius LLP

(57) ABSTRACT

A multilayer electronic component includes: a body including a dielectric layer and a plurality of internal electrodes alternately disposed with the dielectric layer; and external electrodes disposed on the body, wherein the external electrodes respectively include an electrode layer disposed on the body and connected to the plurality of internal electrodes and a conductive resin layer disposed on the electrode layer and including a first conductive particle, a second conductive particle, and a resin, wherein the first conductive particle is a Cu particle, the second conductive particle is a Cu particle having a surface on which Ag is disposed.

9 Claims, 5 Drawing Sheets

MULTILAYER ELECTRONIC COMPONENT

CROSS-REFERENCE TO RELATED APPLICATION

This application claims benefit of priority to Korean Patent Application No. 10-2021-0194289 filed on Dec. 31, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of various types of electronic products such as display devices including liquid crystal displays (LCDs) and plasma display panels (PDPs), computers, smartphones, cell phones, and the like to allow electricity to be charged therein and discharged therefrom.

Such MLCCs having advantages such as compactness, guaranteed high capacitance, and ease in mounting thereof may be used as a component of various electronic devices. In recent years, the MLCCs have also been miniaturized and have had a high capacitance with the miniaturization and high performance of electronic devices, and as such, the importance of securing high reliability of the MLCCs has increased.

In particular, since the MLCCs for industrial and electrical applications have a high operating voltage and a wide range of changes in temperature and humidity of an operating environment, efforts to ensure reliability according to various environmental factors in the state of being mounted on a substrate are essential.

Accordingly, there has been an attempt in a related art to improve flexural strength by introducing a conductive resin layer containing an epoxy resin and conductive metal particles (Cu, Ag) to external electrodes.

When the conductive metal particles are Ag, there is an advantage in that oxidation is suppressed. However, when an Ag content is high or Ag particles are partially condensed and present in the conductive resin layer, ion migration may occur.

However, when the conductive metal particles are Cu, the occurrence of ion migration may be suppressed due to low ionization compared to Ag, but $CO_2$ (outgassing) may occur due to oxidation of Cu and denaturalization of epoxy resins in a high temperature and high pressure operating environment of multilayer electronic components.

In order to solve the above problem, even when the conductive resin layer is formed with a single composition of Ag coated Cu particles, ion migration may still occur depending on uniformity of Ag coating and the content of Ag, and the conductive resin layer is still vulnerable to oxidation according to a grain size and content of Cu particles, etc. and deformation of the epoxy resin may be caused.

Therefore, a conductive resin layer having excellent ESR characteristics and in which an occurrence of outgassing according to a change in the composition of a resin, while ion migration is suppressed, is required.

SUMMARY

An aspect of the present disclosure is to solve a problem of an occurrence of ion migration when a conductive resin layer contains Ag excessively or Ag particles are partially condensed in the conductive resin layer.

An aspect of the present disclosure is also to solve a problem in which a conductive resin layer is easily oxidized or outgassing occurs due to a denaturalization of an epoxy resin in a high temperature, high pressure, and high humidity environment when the conductive resin layer excessively contains Cu.

An aspect of the present disclosure is also to solve the above problems that may still occur when the conductive resin layer is formed with a single composition of Ag coated Cu.

However, the aspect of the present disclosure is not limited to the above and will be more easily understood in the course of describing specific exemplary embodiments of the present disclosure.

According to an aspect of the present disclosure, a multilayer electronic component may include: a body including a dielectric layer and a plurality of internal electrodes alternately disposed with the dielectric layer; and external electrodes disposed on the body, wherein the external electrodes respectively include electrode layers disposed on the body and connected to the plurality of internal electrodes and conductive resin layers disposed on the electrode layer and including a first conductive particle, a second conductive particle, and a resin, wherein the first conductive particle is a Cu particle, the second conductive particle is a Cu particle having a surface on which Ag is disposed, and the conductive resin layer does not include Ag except for Ag disposed on the surface of the second conductive particle.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
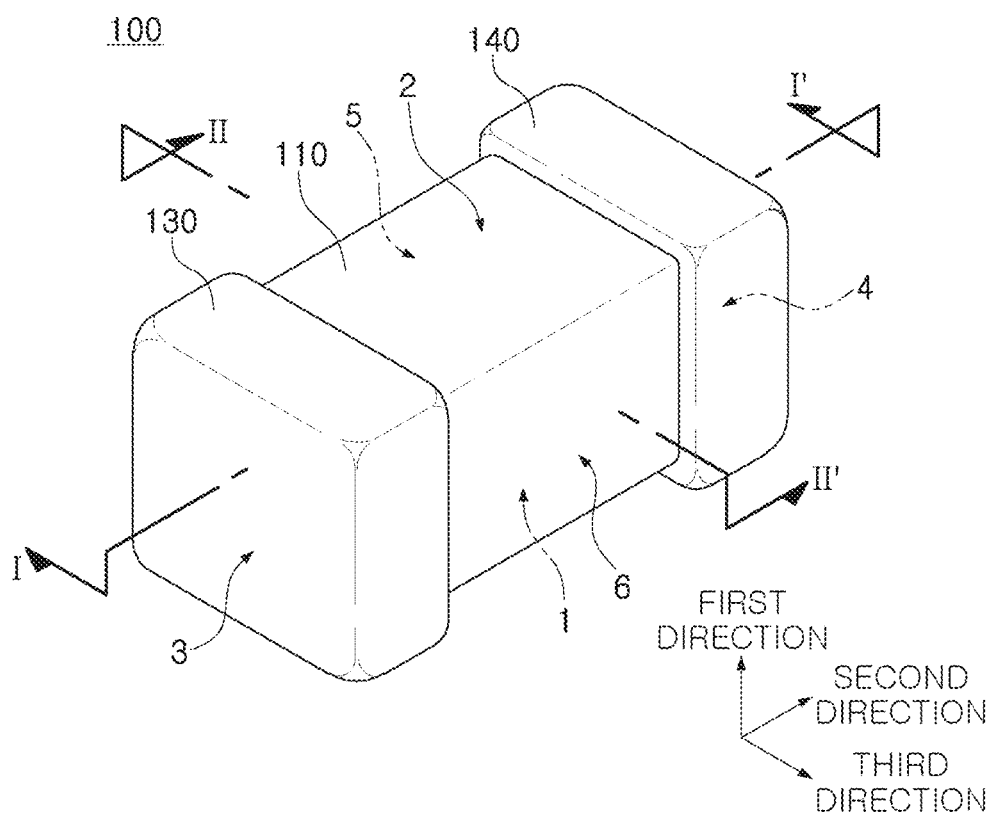
FIG. 1 is a perspective view schematically illustrating a multilayer electronic component according to an exemplary embodiment in the present disclosure.

Exemplary embodiments of the present disclosure will now be described in detail with reference to the accompanying drawings.

In the drawings, a first direction may be defined as a stacking direction or a thickness (T) direction, a second direction may be defined as a length (L) direction, and a third direction may be defined as a width (W) direction.

FIG. 1 is a perspective view schematically illustrating a multilayer electronic component according to an exemplary embodiment in the present disclosure.

Figure 2:
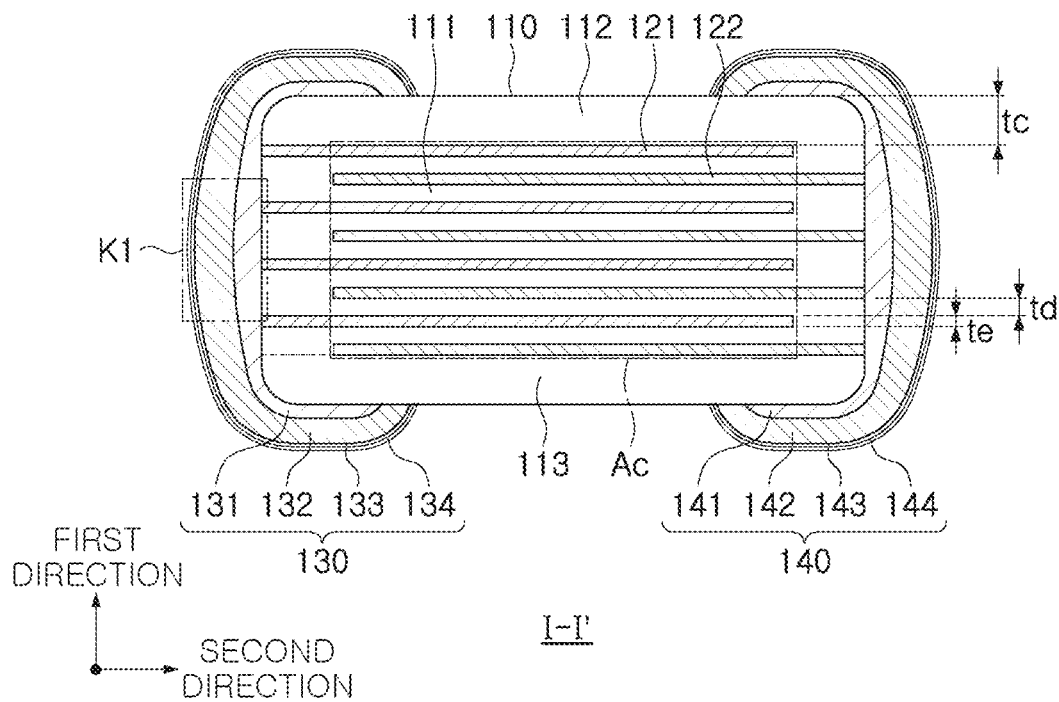
FIG. 2 is a cross-sectional view taken along line I-I' of FIG. 1.

FIG. 2 is a cross-sectional view taken along line I-I' of FIG. 1.

Figure 3:
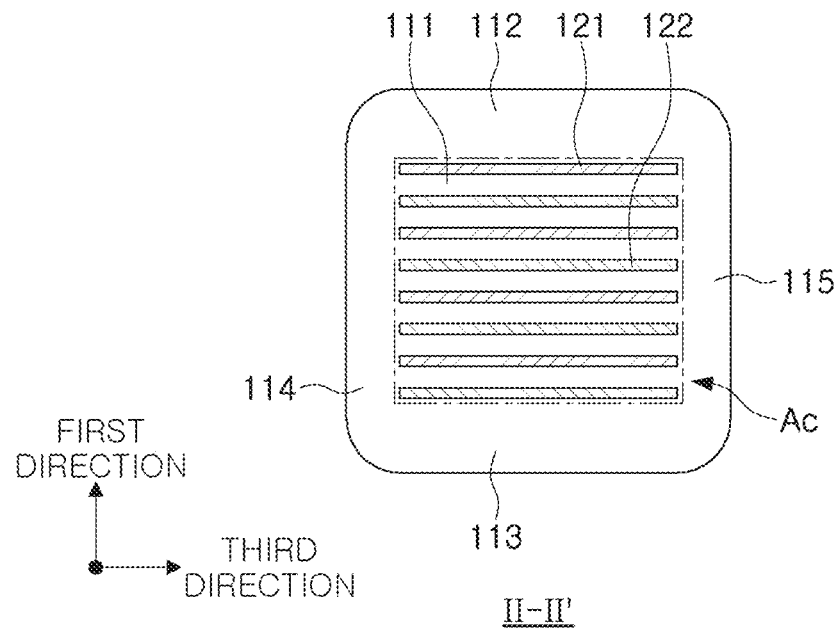
FIG. 3 is a cross-sectional view taken along line II-II' of FIG. 1.

FIG. 3 is a cross-sectional view taken along line II-II' of FIG. 1.

Figure 4:
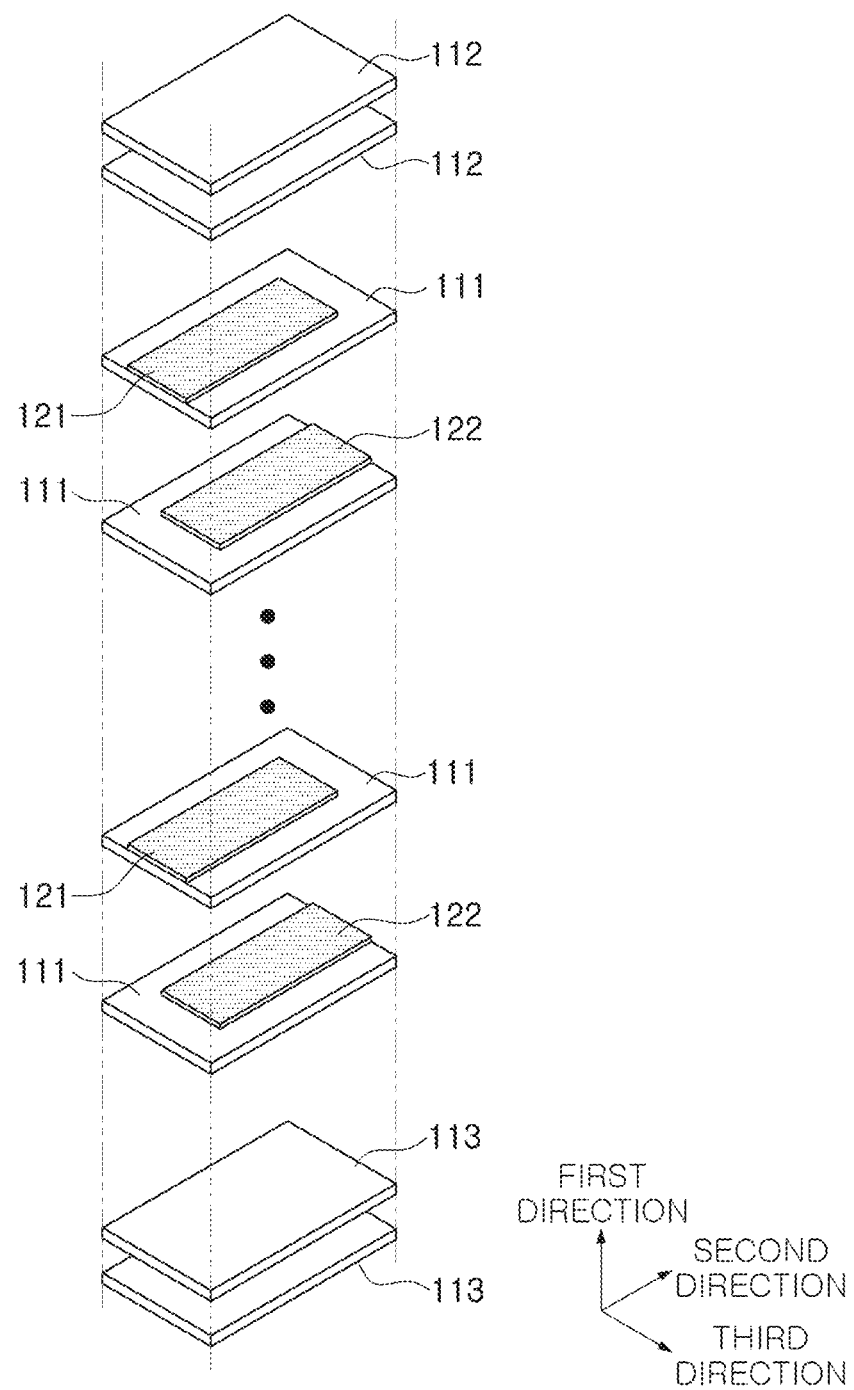
FIG. 4 is an exploded perspective view illustrating a body of a multilayer electronic component according to an exemplary embodiment in the present disclosure.

FIG. 4 is an exploded perspective view illustrating a body of a multilayer electronic component according to an exemplary embodiment in the present disclosure.

Figure 5:
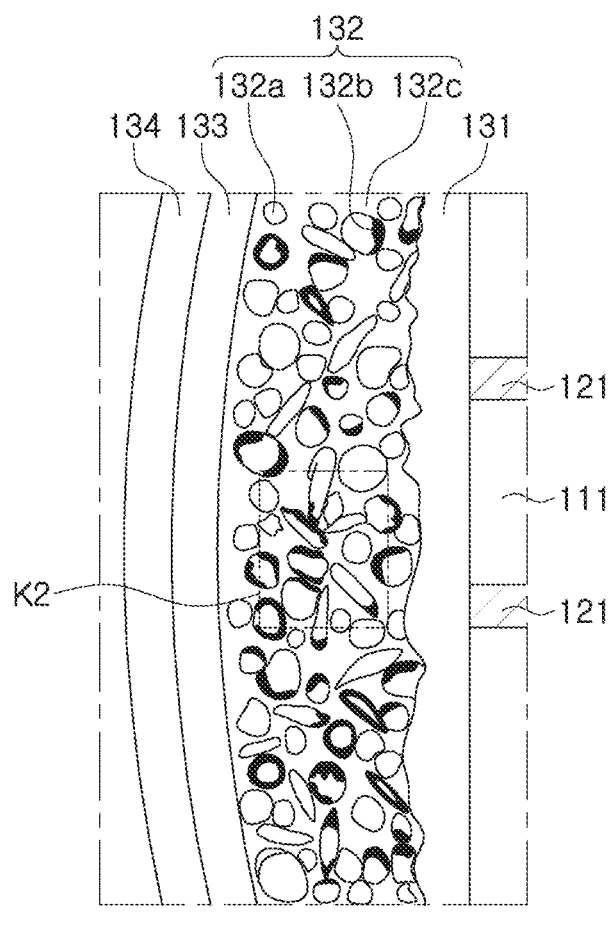
FIG. 5 is an enlarged view of region K1 of FIG. 2.

FIG. 5 is an enlarged view of region K1 of FIG. 2.

Figure 6:
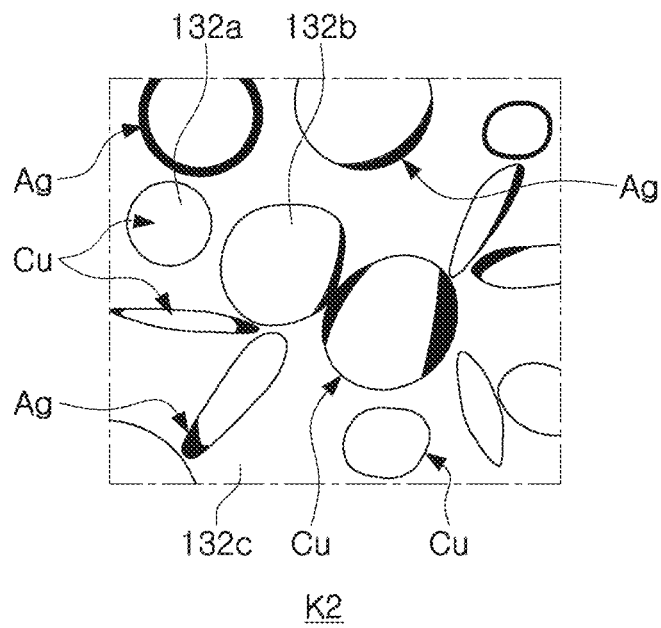
FIG. 6 is an enlarged view of region K2 of FIG. 5.

FIG. 6 is an enlarged view of region K2 of FIG. 5.

Figure 7:
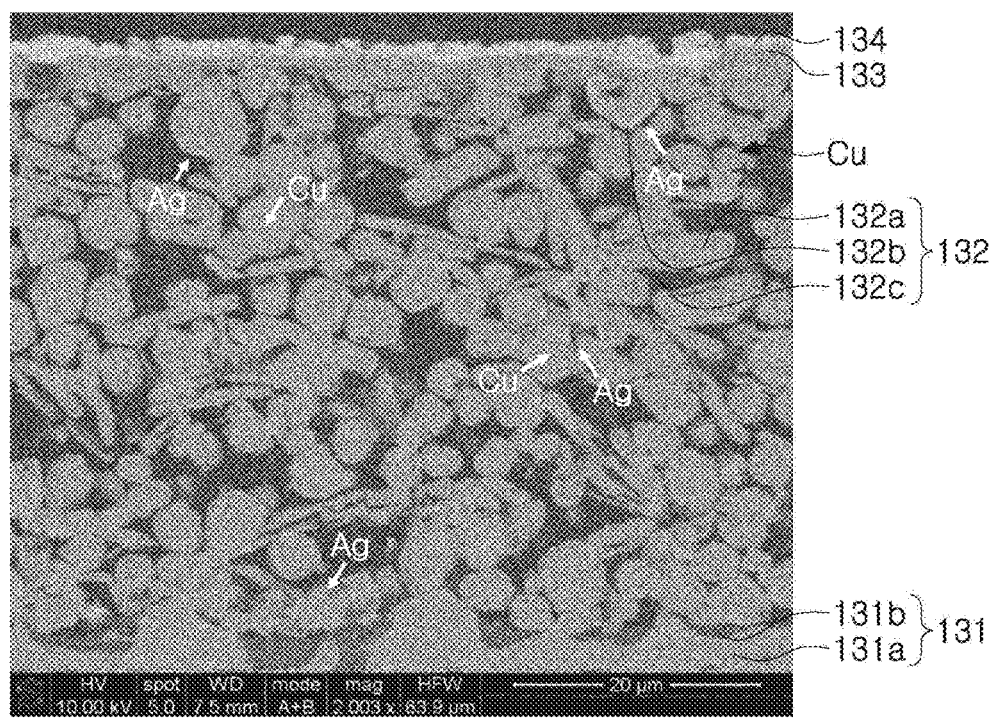
FIG. 7 is an image of a region of a conductive resin layer in a cross-section in a length-thickness direction of a multilayer electronic component according to an exemplary embodiment in the present disclosure observed with a scanning electron microscope (SEM).

FIG. 7 is an image of a region of a conductive resin layer in a cross-section in a length-thickness direction of a multilayer electronic component according to an exemplary embodiment in the present disclosure observed with a scanning electron microscope (SEM).

Hereinafter, a multilayer electronic component 100 according to an exemplary embodiment in the present disclosure will be described in detail with reference to FIGS. 1 to 7.

A multilayer electronic component according to an exemplary embodiment in the present disclosure may include a body 110 including a dielectric layer 111 and a plurality of internal electrodes 121 and 122 alternately disposed with the dielectric layer 111 interposed therebetween; and external electrodes 130 and 140 disposed on the body 110, wherein the external electrodes 130 and 140 include electrode layers 131 and 141 disposed on the body 110 and connected to the plurality of internal electrodes 121 and 122 and conductive resin layers 132 and 142 disposed on the electrode layers 131 and 141 and including a first conductive particle 132a, a second conductive particle 132b, and a resin 132c, wherein the first conductive particle is a Cu particle, the second conductive particle is a Cu particle having a surface on which Ag is disposed, and the conductive resin does not include Ag except for Ag disposed on the surface of the second conductive particle.

In the body 110, the dielectric layer 111 and the internal electrodes 121 and 122 are alternately stacked.

A specific shape of the body 110 is not limited, but, as illustrated, the body 110 may have a hexahedral shape or a shape similar thereto. Due to shrinkage of ceramic powder particle contained in the body 110 during sintering, the body 110 may not have a hexahedral shape with perfect straight lines but a substantially hexahedral shape.

The body 110 may include the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particle, and the ceramic powder particle may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), or $Ba(Ti_{1-y}Zr_y)O_3$ (0<y<1) obtained by partially dissolving calcium (Ca), zirconium (Zr), and the like in $BaTiO_3$.

As a material for forming the dielectric layer 111, various ceramic additives, organic solvents, binders, dispersants, etc. may be added to the powder particle such as barium titanate ($BaTiO_3$) or the like according to purposes of the present disclosure.

Meanwhile, an average thickness of the dielectric layer 111 does not need to be particularly limited. For example, an average thickness td of the dielectric layer 111 may be 0.2 μm or more and 2 μm or less, but is not limited thereto.

The average thickness of the dielectric layer 111 may mean an average thickness of the dielectric layer 111 disposed between the first and second internal electrodes 121 and 122.

The average thickness of the dielectric layer 111 may be measured by scanning an image of a cross-section of the body 110 in the length-thickness direction (L-T) with a scanning electron microscope (SEM) having a magnification of 10,000. More specifically, the average value may be measured by measuring a thickness of 30 points one dielectric layer at equal intervals in the length direction in the scanned image. The 30 points at equal intervals may be designated in a capacitance forming portion Ac. In addition, if the average value is measured by extending to 10 dielectric layers, the average thickness of the dielectric layers may be more generalized.

The body 110 may include a capacitance forming portion Ac disposed inside the body 110 and forming capacitance by including the first internal electrode 121 and the second internal electrode 122 disposed alternately with the dielectric layer 111 interposed therebetween and cover portions 112 and 113 formed on upper and lower surfaces of the capacitive forming portion Ac in the first direction.

In addition, the capacitance forming portion Ac is a portion contributing to capacitance formation of a capacitor and may be formed by repeatedly stacking a plurality of first and second internal electrodes 121 and 122 with the dielectric layer 111 interposed therebetween.

The cover portions 112 and 113 may include an upper cover portion 112 disposed above the capacitor forming portion Ac in the first direction and a lower cover portion 113 disposed below the capacitor forming portion Ac in the first direction.

The upper cover portion 112 and the lower cover portion 113 may be formed by stacking a single dielectric layer or two or more dielectric layers on the upper and lower surfaces of the capacitance forming portion Ac in the thickness direction, respectively, and basically play a role of preventing damage to the internal electrodes due to physical or chemical stress.

The upper cover portion 112 and the lower cover portion 113 do not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

Meanwhile, an average thickness of the cover portions 112 and 113 does not need to be particularly limited. However, in order to more easily achieve miniaturization and high capacity of the multilayer electronic component, the average thickness of the cover portions 112 and 113 may be 15 μm or less, but is not limited thereto.

The average thickness of the cover portions 112 and 113 may mean a size in the first direction, and may be a value obtained by averaging sizes of the cover portions 112 and 113 in the first direction measured at five points at equal intervals at an upper or lower portion of the capacitance forming portion Ac.

In addition, margin portions 114 and 115 may be disposed on a side surface of the capacitance forming portion Ac.

The margin portions 114 and 115 may include a margin portion 114 disposed on the fifth surface 5 of the body 110 and a margin portion 115 disposed on the sixth surface 6 of the body 110. That is, the margin portions 114 and 115 may be disposed on both end surfaces of the ceramic body 110 in the third direction (width direction).

As illustrated in FIG. 3, the margin portions 114 and 115 may mean a region between both ends of the first and second internal electrodes 121 and 122 and a boundary surface of the body 110 in a cross-section of the body 110 taken in the width-thickness (W-T) direction.

The margins 114 and 115 may basically serve to prevent damage to the internal electrodes due to physical or chemical stress.

The margin portions 114 and 115 may be formed by forming the internal electrodes by applying a conductive paste on a ceramic green sheet except for a portion in which the margin portions are to be formed.

In addition, in order to suppress a step difference due to the internal electrodes 121 and 122, the margin portions 114 and 115 may be formed by cutting the internal electrodes, after stacking, to be exposed to the fifth and sixth surfaces 5 and 6 of the body and then stacking a single dielectric layer or two or more dielectric layers on both side surfaces of the capacitance forming portion Ac in the third direction (the width direction).

Meanwhile, the widths of the margins 114 and 115 do not need to be particularly limited. However, the average width of the margin portions 114 and 115 may be 15 µm or less in order to more easily achieve miniaturization and high capacity of the multilayer electronic component, but is not limited thereto.

The average width of the margin portions 114 and 115 may mean an average size of the margin portions 114 and 115 in the third direction, and may be a value obtained by averaging sizes of the margin portions 114 and 115 in the third direction measured at 5 points at equal intervals on a side surface of the capacitive forming portion Ac.

The plurality of internal electrodes 121 and 122 may be alternately disposed with the dielectric layer 111 interposed therebetween.

The plurality of internal electrodes 121 and 122 may include first and second internal electrodes 121 and 122. The first and second internal electrodes 121 and 122 may be alternately disposed to face each other with the dielectric layer 111 constituting the body 110 interposed therebetween, and may be connected to the third and fourth surfaces 3 and 4 of the body 110, respectively.

Specifically, one end of the first internal electrode 121 may be connected to the third surface, and one end of the second internal electrode 122 may be connected to the fourth surface.

The first internal electrode 121 may be spaced apart from the fourth surface 4 and may be exposed through the third surface 3, and the second internal electrode 122 may be spaced apart from the third surface 3 and may be exposed through the fourth surface 4. The first external electrode 130 may be disposed on the third surface 3 of the body to be connected to the first internal electrode 121, and the second external electrode 140 may be disposed on the fourth surface 4 of the body to be connected to the second internal electrode 122.

That is, the first internal electrode 121 may not be connected to the second external electrode 140 but may be connected to the first external electrode 130, and the second internal electrode 122 may not be connected to the first external electrode 130 but may be connected to the second external electrode 140. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may be formed by alternately stacking a ceramic green sheet on which the first internal electrode 121 is printed and a ceramic green sheet on which the second internal electrode 122 is printed, followed by firing.

The material for forming the internal electrodes 121 and 122 is not particularly limited, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), or tungsten (W), titanium (Ti), and alloys thereof.

In addition, the internal electrodes 121 and 122 may be formed by printing a conductive paste for an internal electrode including one or more of nickel (Ni), copper (Cu), palladium (Pd), silver (Ag), gold (Au), platinum (Pt), tin (Sn), or tungsten (W), titanium (Ti), and alloys thereof on a ceramic green sheet. As a printing method of the conductive paste for an internal electrode, a screen-printing method or a gravure printing method may be used, but the present disclosure is not limited thereto.

In an exemplary embodiment, the internal electrodes 121 and 122 may include Ni. In this case, electrical connectivity may be improved by forming an alloy with copper (Cu) included in the first electrode layers 131a and 132a of the present disclosure or through metal bonding.

In addition, the average thickness of the internal electrodes 121 and 122 does not need to be particularly limited. For example, the average thickness of the internal electrodes 121 and 122 may be 0.2 µm or more and 2 µm or less, but is not limited thereto.

Accordingly, when the internal electrodes 121 and 122 have an average thickness of 0.35 µm or less, the effect according to the present disclosure may be more remarkable, and miniaturization and high capacitance of the multilayer electronic component may be more easily achieved.

An average thickness to of the internal electrodes 121 and 122 may mean an average thickness of the internal electrodes 121 and 122.

The average thickness of the internal electrodes 121 and 122 may be measured by scanning an image of a cross-section of the body 110 in the length-thickness direction (L-T) with a scanning electron microscope (SEM) with a magnification of 10,000. More specifically, the average value may be measured by measuring the thickness of one internal electrode at 30 equal intervals in the length direction in the scanned image. The 30 points at equal intervals may be designated in the capacitance forming portion Ac. In addition, if the average value is measured by extending to 10 internal electrodes, the average thickness of the internal electrodes may be further generalized.

The external electrodes 130 and 140 may be disposed on the third surface 3 and the fourth surface 4 of the body 110. The external electrodes 130 and 140 may include first and second external electrodes 130 and 140 disposed on the third and fourth surfaces 3 and 4 of the body 110 and connected to first and second internal electrodes 121 and 122, respectively.

In the present exemplary embodiment, a structure in which the multilayer electronic component 100 has two external electrodes 130 and 140 is described, but the number or shape of the external electrodes 130 and 140 may be modified according to shapes of the internal electrodes 121 and 122 or other purposes.

Meanwhile, the external electrodes 130 and 140 may be formed of any material as long as the material has electrical conductivity such as a metal, and a specific material may be determined in consideration of electrical characteristics and structural stability, and further, the external electrodes 130 and 140 may have a multilayer structure.

According to an exemplary embodiment in the present disclosure, the external electrodes 130 and 140 may include electrode layers 131 and 141 disposed on the body 110.

As a more specific example of the electrode layers 131 and 141, the electrode layers 131 and 141 may be fired electrodes including the conductive metal 131a and the glass 131b.

In addition, the electrode layer may be formed by transferring a sheet including a conductive metal onto the body or by transferring a sheet including a conductive metal onto a fired electrode.

As a conductive metal included in the electrode layer, a material having excellent electrical conductivity may be used, and there is no particular limitation. For example, the conductive metal may be one or more of nickel (Ni), copper (Cu), and alloys thereof.

According to an exemplary embodiment in the present disclosure, the conductive resin layers 132 and 142 are disposed on the electrode layers 131 and 141 and include the first conductive particle 132a, the second conductive particle 132b, and the resin 132c.

The conductive resin layers 132 and 142 may serve to electrically connect the electrode layers 131 and 141 to the first and second plating layers 133, 143, 134, and 144 to be described later, and when the multilayer electronic component 100 is mounted on a substrate, the conductive resin layers 132 and 142 may absorb tensile stress occurring in a mechanical or thermal environment to prevent an occurrence of cracks and to protect the multilayer electronic component 100 from bending stress of the substrate.

According to an exemplary embodiment in the present disclosure, the first conductive particle 132a may be a Cu particle, and the second conductive particle 132b may be a Cu particle with Ag disposed on a surface thereof.

The first conductive particles 132a and the second conductive particles 132b may be dispersed in the form of particles in the conductive resin layers 132 and 142 to secure electrical connectivity. The conductive resin layers 132 and 142 are formed by applying a paste in which the first conductive particles and the second conductive particles are uniformly dispersed in the resin 132c on the electrode layers 131 and 141, and since the conductive resin layers 132 and 142 are formed through a drying and curing process at 100 to 250° C., the first and second conductive particles 132a and 132b are not completely melted and may exist in the form of particles in the conductive resin layers 132 and 142, unlike a formation method by firing.

The first conductive particles 132a and the second conductive particles 132b may be formed by mixing a conductive resin paste in which a resin, a curing agent catalyst, and other additives are mixed with Cu particle powder and a conductive resin paste in which a resin, a curing agent catalyst, and other additives are mixed with Ag coated Cu powder, dispersing the mixture paste, and applying the dispersed paste to the electrode layers 131 and 141.

In the conventional case in which the metal particles included in the conductive resin layer have a single composition of Cu, $CO_2$ (outgassing) may occur due to the oxidation of Cu and the denaturalization of the epoxy resin in a high-temperature and high-pressure operating environment of the multilayer electronic component, and thus, it may be difficult to secure excellent reliability of the multilayer electronic component.

In the conventional case in which the metal particles included in the conductive resin layer have a single composition of Ag, there is an advantage of suppressing oxidation of the conductive resin layer and improving flexural strength, but there is a problem in that ion migration occurs.

In order to solve the above problems, even when the conductive resin layer is formed using the conductive resin paste containing Ag coated Cu particles, Ag particles may be partially condensed in the conductive resin layer of the finished multilayer electronic component depending on uniformity of Ag coating and the content of Ag to still cause ion migration, the conductive resin layer may be still vulnerable to oxidation according to a grain size, content, etc. of the Cu particles and the resin may be deformed.

According to the exemplary embodiment in the present disclosure, the conductive resin layers 132 and 142 include the first conductive particles 132a that are Cu particles, the second conductive particles 132b that are Cu particles with Ag disposed on surfaces thereof, and the resin 132c. Therefore, since the Cu particles and the Cu particles having surfaces on which Ag is disposed coexist, an occurrence of ion migration may be suppressed and oxidation and denaturalization of the resin may be suppressed.

According to an exemplary embodiment in the present disclosure, the conductive resin layers 132 and 142 may not contain Ag except for Ag disposed on the surfaces of the second conductive particles 132b. As described above, even when the conductive resin layer is formed using Ag coated Cu powder, Ag may be partially condensed in the conductive resin layers 132 and 142 depending on a grain size, shape, content, etc. of the Ag coated Cu particles and ion migration may still occur.

In particular, when the conductive resin layer is formed by mixing Ag coated Cu powder and Ag powder or by mixing Ag powder and Cu powder, Ag may be independently present in the form of particles in the conductive resin layer or Ag particles may be condensed with each other so that Ag is concentrated. Accordingly, a portion having a high Ag concentration is partially formed in the conductive resin layer, and ion migration may occur.

Meanwhile, according to an exemplary embodiment in the present disclosure, the conductive resin layers 132 and 142 do not contain Ag other than Ag disposed on the surfaces of the second conductive particles 132b, so that a phenomenon in which Ag particles independently exist in the form of particles in the conductive resin layers 132 and 142 or concentrated is suppressed to further lower a possibility of an occurrence of ion migration. An entire Ag in the conductive resin layer may be disposed on the surface of the second conductive particle. For example, the absence of Ag particles (e.g., particles containing Ag as the main constituent) may be determined by, for example, using an image analysis program (ImageJ) after polishing the multilayer electronic component 100 to ½ of a width thereof, observing a region of length×thickness=30 μm×30 μm in a central portion of each of the conductive resin layers 132 and 142 formed on the third and fourth surfaces of the body in the length-thickness cross-section (L-T cross-section) with a scanning electron microscope (SEM), and analyzing the observed region through an energy dispersive X-ray spectroscopy (EDS) mapping.

In an exemplary embodiment, a ratio of an area occupied by an Ag element to an area occupied by the Cu element in the cross-section of the conductive resin layers 132 and 142 may be 1/9 or more and 3/7 or less.

If the ratio of the area occupied by the Ag element to the area occupied by the Cu element included in the conductive resin layers 132 and 142 is less than 1/9, a specific gravity of Ag in the conductive resin layer may not be sufficient and the ESR characteristic may not be improved, and a phenomenon of resin denaturalization in a high-temperature environment cannot be suppressed.

When the ratio of the area occupied by the Ag element to the area occupied by the Cu element included in the conductive resin layers 132 and 142 exceeds 3/7, the specific gravity of Ag in the conductive resin layer may be excessive and the occurrence of ion migration may not be suppressed.

Accordingly, in an exemplary embodiment, by adjusting the ratio of the area occupied by the Ag element to the area occupied by the Cu element included in the conductive resin layers 132 and 142 to be 1/9 or more and 3/7 or less, the effect of suppressing the occurrence of ion migration, the antioxidant effect, and the effect of suppressing resin denaturalization may be more remarkable. In some embodiments, the ratio may be 2.5/7.5 or greater, or 2.5/7.5 or greater and 3/7 or less.

The area occupied by each of Cu and Ag in the cross-section of the conductive resin layers 132 and 142 and their ratio may be calculated using an image analysis program (ImageJ) after polishing the multilayer electronic component 100 to ½ of a width thereof, observing a region of length×thickness=30 μm×30 μm in a central portion of each of the conductive resin layers 132 and 142 formed on the third and fourth surfaces of the body in the length-thickness cross-section (L-T cross-section) with a scanning electron microscope (SEM), and analyzing the observed region through an energy dispersive X-ray spectroscopy (EDS) mapping.

Specifically, in the cross-section of the conductive resin layer in a length-thickness direction, there is a difference in relative contrast between Cu and Ag in a back scattered electron (BSE) image of a scanning electron microscope (SEM). Therefore, the BSE image may be converted into an image in which the contrast and color are relatively compared based on pixels, and the area of Ag and the area of Cu may be measured through the ImageJ program in the EDS to be calculated.

In an exemplary embodiment, an average particle diameter of the first conductive particles 132a may be different from an average particle diameter of the second conductive particles 132b.

Accordingly, by increasing a packing density of metal particles in the conductive resin layers 132 and 142, strength and electrical conductivity may be improved to reduce ESR.

Meanwhile, the specific gravity occupied by each of Cu and Ag in the conductive resin layers 132 and 142 and the average particle diameter of the first and second conductive particles 132a and 132b may be adjusted by differentiating a mixture ratio of a conductive resin paste obtained by mixing a resin, a curing agent, and other additives with Cu particle powder and a mixture ratio of a conductive resin paste obtained by mixing a resin, a curing agent catalyst, and other additives with Ag coated Cu powder, or by differentiating particle diameters of each powder.

In addition, the average particle diameter of each of the first and second conductive particles 132a and 132b may be calculated using an image analysis program (ImageJ) after polishing the multilayer electronic component 100 to ½ of a width thereof, observing a region of length×thickness=30 μm×30 μm in a central portion of each of the conductive resin layers 132 and 142 formed on the third and fourth surfaces of the body in the length-thickness cross-section (L-T cross-section) with a scanning electron microscope (SEM), and analyzing the observed region through an energy dispersive X-ray spectroscopy (EDS) mapping.

In an exemplary embodiment, the conductive resin layers 132 and 142 may further include a low-melting-point metal. When the conductive resin layers 132 and 142 include a low-melting-point metal, the metal may be melted between the first conductive particles 132a and the second conductive particles 132b to form a network between metal particles, thereby improving electrical conductivity. The low-melting-point metal may be a metal having a melting point of 300° C. or lower.

The low-melting-point metal may be a metal having a lower melting point than Cu included in the first and second conductive particles 132a and 132b and Ag included in the second conductive particles 132b, preferably, may be a metal powder preferably having a melting point of 130 to 250° C., and more preferably, may be a metal containing tin (Sn).

The low-melting-point metal may be formed by adding a low-melting-point metal powder to the paste for forming the resin layers 132 and 142.

A shape of the first conductive particle 132a and a shape of the second conductive particle 132b may vary.

As the content of the plate-shaped particles among the metal particles included in the conductive resin layers 132 and 142 increases, the electrical conductivity may be improved, but the packing density may decrease and a specific surface area may decrease, thereby weakening adhesion with the resin.

Therefore, in an exemplary embodiment, the shapes of the first conductive particles and the second conductive particles may be a plate shape, a flake shape, a dendrite shape, a spherical shape, or a mixture thereof. Accordingly, since the first and second conductive particles 132a and 132b have various shapes, electrical conductivity, packing density, and adhesion to the resin may be improved.

Meanwhile, the conductive resin layers 132 and 142 may include the resin 132c, and in an exemplary embodiment, the resin 132c may include an epoxy resin. However, the type of the resin 132c is not particularly limited, and may be a resin having ductility and strong heat resistance to protect the multilayer electronic component 101 from bending stress. For example, the resin 132c may include phenol resin, urea resin, diallyl phthalate resin, melanin resin, guanamine resin, unsaturated polyester resin, polyurethane resin, epoxy resin, aminoalkyd resin, melamine-urea cocondensation resin, silicon resin, polysiloxane resin and the like, but is not limited thereto. In the case of using a resin, a curing agent, such as a crosslinking agent or a polymerization initiator, may be further added as needed.

The plating layers 133, 143, 134, and 144 may be disposed on the conductive resin layers 132 and 142.

The plating layer serves to improve resistance to external moisture and improve mounting characteristics. The type of the plating layer is not particularly limited, and may be a plating layer including at least one of Ni, Sn, Pd, and alloys thereof, and may be formed of a plurality of layers.

As a more specific example of the plating layer, the plating layer may be a Ni plating layer or a Sn plating layer, and may be a form in which a Ni plating layer and a Sn plating layer are sequentially formed on the electrode layer or a form in which a Sn plating layer, a Ni plating layer and a Sn plating layer are sequentially formed. Further, the plating layer may include a plurality of Ni plating layers and/or a plurality of Sn plating layers.

According to an exemplary embodiment in the present disclosure, the first plating layers 133 and 143 may be disposed on the conductive resin layers 132 and 142 and include Ni. Accordingly, penetration of external moisture into the conductive resin layers 132 and 142 may be prevented.

According to an exemplary embodiment in the present disclosure, the second plating layers 134 and 144 may be disposed on the first plating layers 133 and 143 and include Sn. Accordingly, when the multilayer electronic component 100 is mounted through solder including Sn on a substrate, mounting characteristics may be improved.

A size of the multilayer electronic component 100 does not need to be particularly limited.

However, in order to achieve miniaturization and high capacitance at the same time, it is necessary to increase the number of stacks by reducing the thickness of the dielectric layer and the internal electrodes, and thus, the effect of improving adhesion strength according to the present disclosure may be more remarkable in the multilayer electronic component 100 having a size of 0603 (length×width, 0.6 mm×0.3 mm) or less.

Therefore, in consideration of manufacturing errors and a size of the external electrodes, the effect of improving the adhesion strength according to the present disclosure may be more remarkable when the length of the multilayer electronic component 100 is 0.66 mm or less and the width is 0.33 mm or less. Here, the length of the multilayer electronic component 100 means a maximum size of the multilayer electronic component 100 in the second direction, and the width of the multilayer electronic component 100 means a maximum size of the multilayer electronic component 100 in the third direction.

Example

Table 1 below shows the ESR characteristic, the amount of $CO_2$ gas occurring after a temperature cycle, and a level of ion migration by varying the ratio of the area occupied by the Ag element to the area occupied by the Cu element included in the conductive resin layers 132 and 142, and each measurement and evaluation were performed on a 3225 size multilayer electronic component sample.

As for the area occupied by the Ag element to the area occupied by the Cu element included in the conductive resin layers 132 and 142, as described above, the multilayer electronic component 100 was polished to ½ of a width thereof, and a region of length×thickness=30 μm×30 μm in a central portion of each of the conductive resin layers 132 and 142 formed on the third and fourth surfaces of the body in the length-thickness cross-section (L-T cross-section) was observed as a BSE image with a scanning electron microscope (SEM). Thereafter, the BSE image was converted into an image in which the contrast and color were relatively compared based on pixels, and each area of the regions occupied by Ag and Cu was measured using an image analysis program (ImageJ).

As for ESR characteristic, 200 samples of the multilayer electronic component 100 completed for each test number were mounted on a substrate, and initial ESR vales average values of ESR values after 500 temperature cycles of −55° C. to +125° C. (maintained for 30 minutes at Min./Max. temperatures) were measured. The ESR characteristic was judged as defective when the ESR value exceeded 5.2 after the temperature cycle.

As for the incidence of $CO_2$ gas after the temperature cycle, the amount of $CO_2$ gas occurred while three completed multilayer electronic component 100 samples per Test No. were put in a chamber and heated at a temperature increase rate of 10° C./min. from room temperature to 400° C. under a $N_2$ gas atmosphere was measured through evolved gas analysis-mass spectrometry (EGA-MS). A case in which the incidence of $CO_2$ gas exceeded 20 μg was judged to be defected as a case in which a resin was denatured.

The level of ion migration was measured through a water drop test in which DC 20 V power was applied to the external electrodes of ten completed multilayer electronic component 100 samples per Test No. Specifically, after power was applied, dendrite growing from a cathode to an anode was observed on a surface of a body between external electrodes, and a current of 1 mA or more flowed immediately when both electrodes were connected by dendrite. To evaluate the level of ion migration in Table 1, a time for which a current of 1 mA or more flowed as both electrodes were connected by dendrite was measured. At this time, a case in which the time for which the current of 1 mA or more flowed was less than 150 seconds was judged as defective.

TABLE 1

| Test No. | Ration of area of Ag to Cu (Cu:Ag) | ESR (mΩ) Initial value (mΩ) | ESR (mΩ) Value after temperature cycle (mΩ) | Incidence of $CO_2$ (μg) | Current leakage (~1 mA) Occurrence time (sec) |
|---|---|---|---|---|---|
| 1 | 0 (10:0) | 5.0 | 7.0 | 25~35 | Exceeding 300 |
| 2 | 1/9 (9:1) | 4.0 | 5.2 | 15~20 | Exceeding 300 |
| 3 | 1/4 (8:2) | 3.2 | 4.3 | 5~10 | 200~300 |
| 4 | 3/7 (7:3) | 2.4 | 4.0 | 3~5 | 150~180 |
| 5 | ∞ (0:10) | 2.0 | 3.5 | 1~3 | 30~60 |

Test No. 1 is a case in which the ratio of the area occupied by the Ag element to the area occupied by the Cu element included in the conductive resin layers 132 and 142 is less than 1/9. It can be seen that the ESR characteristic is not improved because the specific gravity occupied by Ag in the conductive resin layers is not sufficient and the phenomenon of resin denaturalization cannot be suppressed in a high-temperature environment.

Test No. 5 is a case in which the ratio of the area occupied by the Ag element to the area occupied by the Cu element included in the conductive resin layers 132 and 142 exceeds 3/7, and the specific gravity of Ag in the conductive resin layer is excessive. It can be seen that the occurrence of ion migration cannot be suppressed due to the excessive specific gravity of Ag in the conductive resin layer.

In Test Nos. 2 to 4, the ratio of the area occupied by the Ag element to the area occupied by the Cu element included in the conductive resin layers 132 and 142 satisfies 1/9 or more and 3/7 or less, and excellent ESR characteristic is obtained. It can be seen that the occurrence of $CO_2$ gas due to the denaturalization of the resin may be suppressed.

Therefore, according to an exemplary embodiment, by adjusting the ratio of the area occupied by the Ag element to the area occupied by the Cu element included in the conductive resin layers 132 and 142 to be 1/9 or more and 3/7 or less, the effect of suppressing the occurrence of ion migration, the antioxidant effect, and the effect of suppressing resin denaturalization may be more remarkable.

One of the several effects of the present disclosure is to suppress oxidation of a metal included in the conductive resin layer, suppress denaturalization of a resin, and suppress an occurrence of ion migration by including both Cu particles and Cu particles with Ag disposed on the surface of the Cu particles in the conductive resin layer, which is susceptible to oxidation.

One of the various effects of the present disclosure is to suppress oxidation of the metal included in the conductive resin layer, suppress the denaturalization of the resin, and suppress the occurrence of ion migration by adjusting the area occupied by the Cu element and the area occupied by the Ag element included in the conductive resin layer.

One of the various effects of the present disclosure is to suppress ion migration that may occur due to condensation of Ag particles by suppressing the formation of sole Ag particles in the conductive resin layer.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
    a body including a dielectric layer and a plurality of internal electrodes alternately disposed with the dielectric layer; and
    external electrodes disposed on the body,
    wherein each of the external electrodes includes an electrode layer disposed on the body and connected to the plurality of internal electrodes and a conductive resin layer disposed on the electrode layer and including a first conductive particle, a second conductive particle, and a resin,
    wherein the first conductive particle is a Cu particle, the second conductive particle is a Cu particle having a surface on which Ag is disposed, and the conductive resin layer does not include Ag except for Ag disposed on the surface of the second conductive particle.

2. The multilayer electronic component of claim 1, wherein a ratio of an area occupied by the Ag to an area occupied by the Cu in a cross-section of the conductive resin layer is 1/9 or greater and 3/7 or less.

3. The multilayer electronic component of claim 1, wherein an average particle diameter of the first conductive particle is different from an average particle diameter of the second conductive particle.

4. The multilayer electronic component of claim 1, wherein the conductive resin layer further includes a metal having a melting point of 300° C. or lower.

5. The multilayer electronic component of claim 1, wherein the first conductive particle and the second conductive particle have a plate shape, a flake shape, a dendrite shape, a spherical shape, or a mixture thereof.

6. The multilayer electronic component of claim 1, wherein a first plating layer is disposed on the conductive resin layer and includes Ni.

7. The multilayer electronic component of claim 6, wherein a second plating layer is disposed on the first plating layer and includes Sn.

8. The multilayer electronic component of claim 1, wherein the electrode layer includes a conductive metal and glass.

9. The multilayer electronic component of claim 1, wherein the resin includes an epoxy resin.

* * * * *